July 15, 1969  R. LAHAYE ETAL  3,455,157
DENSITY MEASURING DEVICE
Filed Dec. 9, 1966
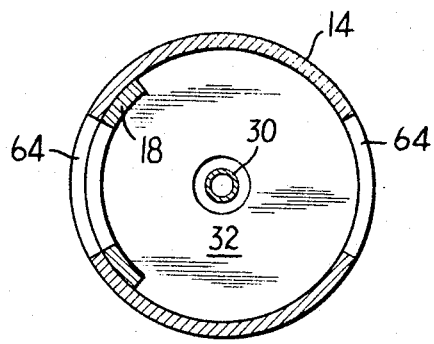
FIG. 2
FIG. 1
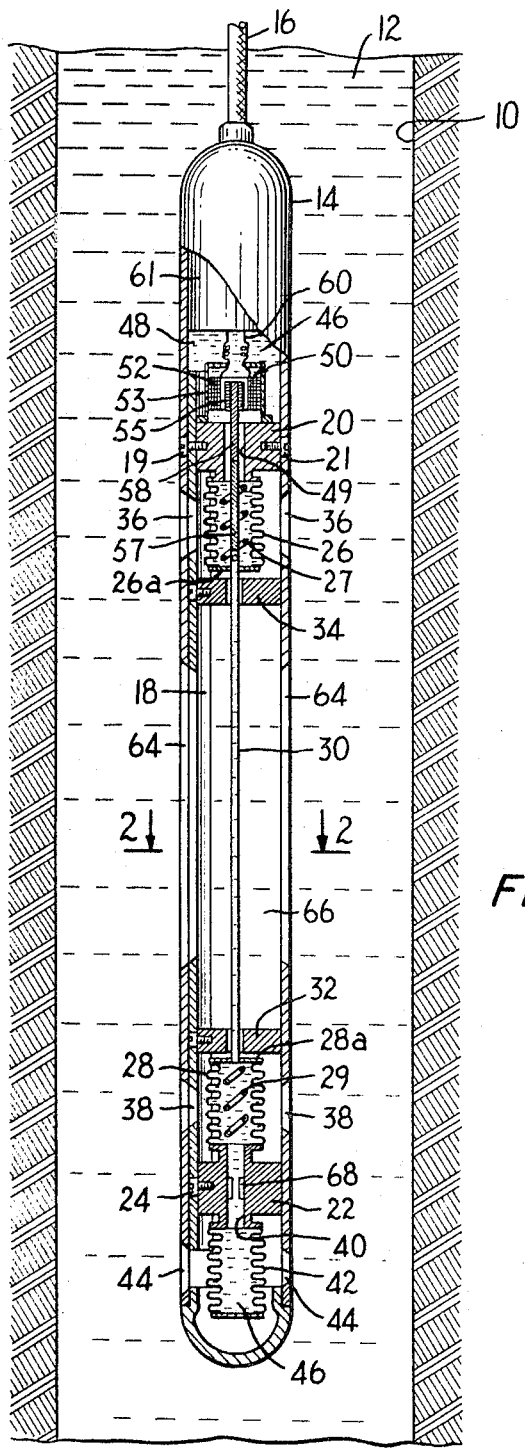
INVENTORS
RAYMOND LAHAYE &
JEAN-LOUP BONNET
BY Brumbaugh, Free, Graves & Donohue
their ATTORNEYS

# United States Patent Office 3,455,157
Patented July 15, 1969

3,455,157
DENSITY MEASURING DEVICE
Raymond Lahaye, Clamart, and Jean-Loup Bonnet,
Verriere-le-Buisson, France, assignors to Societe
de Prospection Electrique Schlumberger, S.A.,
Paris, France
Filed Dec. 9, 1966, Ser. No. 600,591
Claims priority, application France, Dec. 14, 1965,
42,081/65
Int. Cl. E21b 47/06
U.S. Cl. 73—151                                23 Claims

ABSTRACT OF THE DISCLOSURE

Apparatus for measuring the specific weight or density of fluids in which the displacement of a pair of diaphragm means, subjected to static pressures of the fluid at vertically separate positions in the borehole, is detected.

---

This invention relates to apparatus for measuring the specific weight or density of fluids in boreholes and the like in which the apparatus is immersed and, more particularly, to apparatus of this type in which the displacement of a pair of diaphragm means, subjected to static pressures of the fluid at vertically separate positions in the borehole, is detected.

Apparatus of this type, sometimes called gradiomanometers, have been in general use for some time and have proved valuable in examining and determining the properties of fluids in well bores. In one type of arrangement, a pair of bellows forming measuring chambers are independently filled with liquid and arranged to be acted upon by the static pressure at different depths of the fluid in the borehole. A differential system, e.g., a comparing bellows, is provided for measuring the difference between the compressions of the bellows in response to the static pressures at the separate vertical locations in the borehole. This measurement provides an indication of the specific gravity or density of the borehole fluid in the zone defined between these locations. A description of apparatus employing this scheme may be found in U.S. Patent No. 3,184,965 to Noik.

A major problem heretofore encountered in the employment of such in apparatus borehole fluids has been the measurement error introduced by extraneous factors. These factors may include, for example, pressure actions caused by accelerations and vibration of the apparatus, as well as variations in the volume of the liquid filling the bellows due to the effects of pressure and temperature. Further measurement errors are commonly introduced through thermal expansion of mechanical elements in the apparatus.

Additional measurement inaccuracies are ascribable to the inherent shortcomings of the bellows themselves. Even though the two measuring bellows are initially carefully matched, eventual dissimilarity through aging and operation gives rise to an inequality in their stiffnesses and, hence, to error resulting from unequal expansion or compression of the bellows for any given static fluid pressure. Under such conditions, the differential pressure to which the comparing bellows is subjected no longer corresponds exactly the difference between the static pressures appearing at the levels of the measuring bellows. This condition may be remedied only by replacing the bellows and recalibrating the instrument.

Still another source of error is present where the volumes of liquid filling the measuring chambers formed by the bellows are not identical, such as where air bubbles become entrained in the filling liquid or where the liquids in the separate chambers are at different temperature and pressure conditions at the time of filling.

It is therefore a primary object of the present invention to provide improved apparatus of the type described which is capable of measurements free from a good part of the errors introduced by the presence of the mentioned factors.

A further object of the invention is to provide improved apparatus for measuring the specific weight and/or density of borehole fluids, which is relatively simple in its construction and reliable in operation.

Briefly, these and other objects of the invention are attained in an apparatus including an elongated casing adapted for immersion in the borehole fluid. First and second diaphragm means, which may be bellows and forming a pair of vertically spaced measuring chambers, are carried by the casing and are displaceable in response to the static pressures of the borehole fluid adjacent thereto. The measuring chambers are interconnected and preferably occupied by a filling liquid so that the vertically displaced measuring chambers constitute a single liquid-filled chamber within the casing. An indication of fluid density in the longitudinal zone defined between the diaphragm means is obtained by translating into electrical signals the displacement of the diaphragm means from a reference position in response to the difference between static pressures of the borehole fluid adjacent the separate measuring chambers.

In a preferred embodiment, the measuring chambers intercommunicate through a rigid hollow tube connecting the diaphragm means of each measuring chamber, and a third chamber of expansible volume is disposed below and communicates with the lower of the two measuring chambers to absorb expansion of the filling liquid due to the effects of temperature and pressure. In addition, the mechanical elements of the total assembly are designed and arranged to substantially remove erroneous indications due to thermal distortion as the apparatus is moved through the borehole fluid.

For a better understanding of these and other objects of the invention, together with the further aspects and advantages thereof, reference may be made to the following detailed description and to the drawings wherein:

FIGURE 1 is a longitudinal cross-sectional view through an apparatus constructed in accordance with the invention; and FIGURE 2 is a cross-sectional view taken generally along the lines 2—2 in FIGURE 1.

Turning now to the drawings, there is illustrated a borehole 10 which is filled with a fluid, for example crude oil, of which the specific gravity at various depths in the borehole is to be determined. The apparatus, in accordance with the invention, includes an elongated casing 14 which is supported by a cable 16 for vertical movement through the borehole 10. Mounted inside and adjacent the inner wall of the casing 14 is a carriage 18 extending in the direction of casing elongation. The carriage 18 is preferably secured to the casing 14 at a single location, such as by the screw 19 extending through the casing and engaging the carriage 18.

In the upper extent of the casing is positioned a circular plug 20 engaged by the screw 19 and the screw 21 extending through the casing wall opposite the screw 19. The screws 19 and 21 together secure the carriage assembly to the casing 14 at a single longitudinal location for freedom of relative longitudinal deformation or expansion of these two parts below the location of support, the purpose of which will be explained at a later point. A plug 22 similar to the plug 20 is located near the lower end of the casing 14 and is fastened to the carriage 18 by the screw or screws 24.

Welded to axial extensions of the plugs 20, 22, are the fixed ends of measuring bellows 26, 28 having diaphragms or movable ends 26a, 28a, respectively, each displaceable in the direction of the casing axis when the bellows are subjected to the static pressure of the borehole fluid 12. Located inside the bellows 26, 28 are helical springs 27, 29, respectively, under extension and preferably constructed from a material having a thermoelastic coefficient which is opposite in arithmetical sign to the thermoelastic coefficient of the bellows 26, 28, to counteract changes in bellows assembly stiffness when the environmental (fluid) temperature varies. A rigid hollow link 30 is secured to the displaceable ends 26a, 28a of the measuring bellows and opens at either end into the chambers of the respective bellows 26, 28. As will be explained shortly, the length of the link 30 generally defines the longitudinal fluid zone over which the specific gravity of the borehole fluid is measured by the apparatus. Immediately above the lower bellows 28 and fastened to the carriage 18 is a circular plug 32 having an aperture therethrough for accepting the link 30. A further plug 34 is located immediately below the upper measuring bellows 26 and is similarly secured to the carriage 18.

At the same level that the upper measuring bellows 26 are narrow slots 36 extending through the casing 14 and carriage 18 to allow the bellows 26 to be compressed or expanded by variations in the static pressure of the borehole fluid 12 as the instrument moves through the borehole 10. Similar slots 38 are formed in the casing and carriage in longitudinal registration with the lower measuring bellows 28 for exposing this bellows to the static pressure of the borehole fluid 12 at the lower location. Communicating with the interior of the lower bellows 28 through a passage 40 in the plug 22 is an expansion bellows 42 of which the physical stiffness, or elastic coefficient, is substantially less than that of the pair of measuring bellows 26, 28. This bellows 42 is also ported through the slots 44 to the borehole fluid 12.

The bellows 26 and 28 each form a measuring chamber of which the diaphragm elements 26a, 28a are displaceable in accordance with the static pressures of the borehole fluid 12. The chambers so formed are filled with a suitable filling liquid 46, such as kerosene, of known physical properties. As observed in FIGURE 1, the fluid 46 fills the expansion chamber of the bellows 42, measuring chambers 26, 28 and hollow link 30, as well as an additional chamber 48 above and communicating with the upper measuring chamber 26 through a passage 49 in the plug 20. The combination of the measuring and expansion chambers, along with the chamber 48, therefore, constitutes a single reservoir for the filling liquid.

Immersed in the uppermost chamber 48 is an electrically excited transducer 50, such as a differential transformer, including a winding 52 secured to a frame 53, and an axially movable core 55. The core 55 is attached to the link 30 by way of the rigid link extension sections 57 and 58 extending through the fixed end of the bellows 26 and the upper passage 49, respectively. The solid extensions 57 and 58 of the link 30 are preferably constructed from materials which have different coefficients of thermal linear expansion. By way of illustration, the section 57 may be made from stainless steel, as may be the carriage 18, and the section 58 of an aluminum alloy.

As the diaphragms 26a, 28a are displaced by the force of the static pressures of the borehole fluid, the rigid link 30 is moved axially in the casing, the extensions 57 and 58 moving with the link 30 to position the core 55 of the differential transformer 50. Displacement from from a zero position of the core 55 yields an electrical signal across a pair of output conductors 60 from the transducer indicative of the specific weight or density of the borehole fluid 12 in the zone defined between the measuring bellows. An electronic cartridge unit 61 located above the uppermost chamber 48 receives the electrical signals on the conductors 60 for amplification and transmission to the surface over a transmission line within the armored cable 16. This unit is desirably designed with a predetermined transfer characteristic (time constant) to provide electrical damping of the transducer voltage signal.

Large openings 64 are provided in the casing 14 and carriage 18 so that the intermediate chamber 66 defined between the plugs 32 and 34 is occupied by borehole fluid 12 upon immersion of the apparatus. Dynamic pressure created by movement of the casing 14 through the borehole fluid 12 is prevented from acting upon the bellows 26, 28 by the plugs 32 and 34. Additionally, the slots 36, 38 adjacent the measuring bellows are made quite narrow so that the sides of the bellows 26, 28 are shielded from dynamic pressure effects of the fluid entering through these slots.

From the foregoing description, it will be seen that since the diaphragm elements 26a, 28a of the respective bellows are maintained a constant distance apart, an axial displacement of one of the diaphragm elements is accompanied by a like displacement of the other of the diaphragm elements in the same direction. Thus, for example, when the bellows 26 and 28 are subjected to the static pressures in the borehole fluid 12, compression of the bellows 28 is accompanied by extension of the bellows 26, and both of the diaphragms 26a, 28a will move downwardly. Conversely, a distension of the bellows 28 is accompanied by a compression of the bellows 26, and the diaphragms 26a, 28a move together in the upward direction.

The voltage V developed at the input 60 of the electronic cartridge 61 in response to movement of the core 55 in the transformer 50 may be expressed as follows:

$$V = A(X_1 - X_0) \quad (1)$$

where A is a constant relating the transducer output voltage V to the physical displacement of the core 55, $X_0$ is the initial position assumed by the core 55 when the apparatus is located vertically in air (approximately zero density), and $X_1$ is the position assumed by the core 55 when the apparatus is immersed and subjected to the static pressure of the borehole fluid 12.

The displacement of the transducer core 55 and the diaphragms 26a, 28a may be expressed as follows:

$$(X_1 - X_0) = \frac{sh}{k}(\rho + \rho_0 - \rho_1) \quad (2)$$

where S is the operative area of the measuring bellows 26 or 28, and $h$ is the distance separating the levels of application of the resultant of the compressional forces on each of the bellows 26, 28. The distance $h$ is slightly longer than the length of the connection link 30, since the point of application of the fluid compressional forces is slightly displaced from the diaphragms 26a, 28a. The symbol $k$ is the system stiffness resisting compression or expansion of the bellows 26, 28 and equals the sum of the individual stiffnesses ($k_1$, $k_2$) of the bellows 26, 28 and springs 27, 29. In expression (2) $\rho$ is the density of the fluid to be measured, $\rho_0$ is the density of the liquid 46 filling the bellows under calibration conditions, and $\rho_1$ is the density of the filling fluid in the bellows 26, 28 at the time and location of the measurement in the borehole 10.

Before immersing the apparatus for measurements, it is calibrated for sensitivity and zero adjustment. Calibration proceeds as follows. The casing is placed vertically in air and the core 55 positioned relative to the transformer windings 52, to obtain a minimum (null) output voltage V. Under surface conditions $\rho_0$ equals $\rho_1$, and output voltages V are proportional to the density of the fluid in which the apparatus is to be immersed.

The next calibration step is to immerse the apparatus vertically in a suitable container filled with a liquid of known specific weight or density, such as water. The excitation voltage on the transformer 50 or the amplification produced in the electronic cartridge 61, 60 is then adjusted to obtain a suitable constant A (expression (1))

so that the indication on an indicator at the surface connected to the output of the cartridge 61, 66 reads the density of the water on a convenient scale. With the constant A and the zero position $X_0$ of the transformer core 55 thus determined, the apparatus may then be lowered into the borehole fluid.

Once the apparatus is immersed in the fluid 12, the volume of liquid 46 filling the bellows 26, 28 and 42 varies as a function of the temperature and pressure of the surrounding fluid. Changes in filling liquid volume are absorbed by the expansion chamber 42 which, as noted, communicates with the lower measuring chamber 28 through the passage 40. It is desirable that the bellows 42 be substantially unresponsive to dynamic forces of the fluid 46 in the bellows 26 and 28, but that it nevertheless be capable of expanding and contracting in accordance with filling liquid volume variations. To this end, a throttle valve 68 is installed in the passage 40 so that slow volume changes are reflected in a flow of fluid in the passage 40. Because of the fluid damping provided by the throttle valve 68, pressure variations of filling liquid within the bellows 28 is not accompanied by a rapid flow rate of liquid through the passage 40. Slow variations in the volume of the filling fluid 46, on the other hand, such as those brought about by temperature changes, may be compensated for by the expansion bellows 42.

In this connection, it may be noted that the operative areas $S_1$ and $S_2$ of the bellows 26, 28 are preferably made as nearly equal as possible, since it can be determined that an accurate formula for the displacement of the rigid link 30 and transformer core 55 contains a term of error depending on the term $k_3 (S_1-S_2)$. For the foregoing reason, the stiffness $k_3$ of the expansion bellows 42 should be selected to be as small as possible, desirably substantially smaller than the stiffness $k_1$ and $k_2$ of the bellows assemblies including the bellows 26, 28 and springs 27, 29.

It was pointed out earlier that a former source of error in familiar apparatus of this type is the presence of air in the separate chambers formed by the measuring bellows. In accordance with the present invention, however, any air entrained in the filling fluid rises to the uppermost, or auxiliary, chamber 48 through the interconnecting passages between the bellows, and does not influence the calibration made in surface conditions. Anyhow, in downhole conditions, the presence of bubbles in the filling fluid does not change the measurements since the disappearance of said bubbles under the action of static pressures leads to a diminution of the volume of expansion chamber 42, only. Also, inaccuracies derived from dynamic fluid forces are almost entirely eliminated, since the bellows 26, 28 are isolated from the influence of such forces by the narrow dimension of the slots 36 and 38, and by the fluid deflecting action of the plugs 32 and 34 adjacent the bellows.

Referring to expression (2), it is apparent that a variation $(\rho_1-\rho_0)$ in the density of the filling liquid introduces error in the output voltage V corresponding to a shift of the core 55 from the zero position $X_0$. As is well known, the density $\rho$ of any liquid is directly related to its temperature T and pressure P. In the instrument described, the temperature and pressure of the filling liquid 46 will affect the displacement of the transformer core 55. It has been found that, in practice, changes in the liquid pressure may be ignored, since temperature and pressure of the liquid at various levels of the borehole are interrelated (about 4 kg./cm.² per 1° C.). Moreover, the behavior of the filling liquid, e.g., kerosene, in response to temperature and pressure variations is known. As an example, an increase in the temperature of kerosene of 100° C. reduces its density by 10 cg./cm.³, while a pressure rise of 100 kg./cm.³ increases the density by .6 cg./cm.³. A simple relation exists, therefore, which, in practice, is independent of pressure. This is:

$$(\rho_1-\rho_0)=\beta(T_1-T_0) \qquad (3)$$

where $T_1$ and $T_0$ are the temperatures of the borehole fluid under measurement and calibration conditions, respectively, and $\beta$ is a proportionality coefficient, constant under borehole conditions. Given this simple relation, the voltage V may be compensated accordingly to substantially reduce measurement errors brought about by such temperature and pressure variations of the filling liquid.

To the end of reducing shift in the zero position of transformer core 55 due to thermal expansion of critical mechanical elements, the carriage 18, transformer frame 53, plug 20 and the rigid link 30 are all selected of a material, such as stainless steel, having the same coefficient of thermal linear expansion. Since the components of the transformer 50 are submerged in the filling fluid 46, they are at the temperature of the fluid and expand and contract in response to the same temperature variations influencing the other mechanical elements of the system. The section 58 of the link extension, however, is, as mentioned above, constructed from a material having a different coefficient of linear expansion. Assuming that $\alpha_1$ is the coefficient of expansion of the assembly including the carriage 18, section 57 and frame 53 supporting the transformer 50, and that $\alpha_2$ is the expansion coefficient of the section 58, the shift $\Delta_x$ of the transformer core 55 from the zero position is proportional to $(\alpha_2-\alpha_1)$ and the length $y$ of the section 58. Specifically, this displacement is:

$$\Delta_x=y(\alpha_2-\alpha_1)(T_1-T_0) \qquad (4)$$

From expression (2), it will be recalled that the displacement of the core 55 due to density changes in the filling fluid is:

$$X_1-X_0=\Delta_x=\frac{Sh}{k}(\rho_0-\rho_1) \qquad (5)$$

Combining Equations 3, 4 and 5 and solving, we obtain for $y$ the length of section 58:

$$y=\frac{Sh\beta}{k(\alpha_2-\alpha_1)} \qquad (6)$$

Thus, by properly selecting the length of the link extension section 58, the zero shift error introduced by temperature and pressure changes of the filling liquid may be completely offset.

In this connection, it should be again remarked that thermal deformation or expansion of the carriage 18 is independent of expansion of the casing 14, since the carriage 18 and plug 20 are secured to the casing at a single vertical level by the screws 19 and 21. For the foregoing reason, thermal deformation of the casing 14 does not bring about a corresponding expansion or contraction of the carriage dimension.

Referring again to Equation 2, it is noticed that the term $Sh/k$ will also be influenced by the environmental temperature of the borehole fluid, since the system stiffness $k$ is dependent upon temperature. This stiffness is therefore made relatively constant in the operating temperature range through the use of the springs 27, 29 within the bellows 26 and 28. These springs are constructed from a material having a thermoelastic coefficient of arithmetical sign opposite to the sign of the thermoelastic coefficient of the bellows. For example, the bellows 26, 28 may be constructed of phosphorus bronze which has a thermoelastic coefficient of $-3.8 \times 10^{-4}/°$ C. The springs 27, 29, on the other hand, may be made from Invar, which has a thermoelastic coefficient of $+5 \times 10^{-4}/°$ C. The opposite thermal response of the bellows and springs, therefore, makes it possible to maintain the total stiffness of the system fairly constant over the operating temperature range of the apparatus, and keep sensitivity variations attributable to the term $Sh/k$ to within about .5% per 100° C.

It can be observed in FIGURE 1 that the bellows 26, 28, and springs 27, 29 and the connecting link 30 and its associated extensions 57 and 58, along with the transformer core 55, form an oscillating system. It can be shown that where the mass M of the mechanical elements forming the oscillating system is equal to the term $Sh\rho_0$, residual oscillations detected by the differential transformer 50 are reduced to a minimum. The term $Sh\rho_0$, of course, defines the mass of the column of the filling liquid of which the effective cross section is equal to the operative area S of the bellows and the height is equal to the measuring height $h$. The relation $M = Sh\rho_0$ assumes that the force oscillations, i.e., those oscillations induced by periodic vertical oscillations of the instrument at the end of the cable 16, are less than about 1 cycle per second. Experimentation and available data proves that this is usually the case.

Further calculation also shows that the minimum amplitude of residual oscillations of the oscillating system increases when the damping time constant associated with the oscillating system is raised. Damping of the oscillating system should be selected, therefore, to obtain a time constnt which is as low as practicable.

The time constant of the oscillating system is chiefly dependent on the viscous damping inside the rigid link 30 (Poiseuille Law). Since the viscosity of the filling liquid 46 is known, it is possible to define the dimensions of the passage through the link 30 to obtain a predetermined time constant which satisfies the conditions imposed. In general, this time constant is selected to be on the order of .1 second. Owing to the fact, however, that the mechanical time constant assigned to the mechanical system is low in order to reduce residual oscillations to a minimum, it is desirable to add a time constant to the electrical system including the transducer 50 and electronic cartridge 61. A satisfactory electrical time constant has been found to be in the order of about .5 to 1 second in order to obtain a perfectly acceptable compromise between system response and damping. The electrical time constant may be introduced in any well-known manner, as by filtering the signals on the conductors 60 or by adjusting the bandwidth of amplifiers within the cartridge.

From the preceding description, it is manifest that several common sources of measurement error are nullified by the novel arrangement and design of the components of the present gradiomanometer. The predominant single source of inaccuracy, viz., temperature variations, is largely compensated by the predetermined physical and thermal relation among the carriage, bellows assemblies, connecting link and transducer, as well as by the employment of an expansion chamber. Moreover, the dynamic electrical and physical responses of the system are controlled by the selection of suitable mechanical and electrical time constants, and the forces attributable to dynamic pressure exerted by the borehole fluid are substantially isolated from the active system components.

Although the invention has been described with reference to specific embodiments thereof, these embodiments are exemplary and many modifications and variations, both in form and detail, will occur to those skilled in the art. All such modifications and variations, therefore, are intended to be included within the scope and spirit of the appended claims.

We claim:
1. Apparatus for examining fluid-filled boreholes and the like, comprising:
   an elongated casing adapted to be vertically immersed in the borehole fluid;
   first and second diaphragm means carried by the casing forming a pair of vertically spaced measuring chambers of which a respective diaphragm means is displaceable in a common direction from a reference position in response to the static pressure of the borehole fluid adjacent thereto;
   means in the casing providing a passage intercommunicating the interiors of the respective chambers;
   means connecting the first and second diaphragm means for maintaining equal the displacements of the first and second diaphragm means from the respective reference position;
   liquid filling the measuring chambers and passage; and
   means carried by the casing responsive to the displacements of the first and second diaphragm means from the reference position for obtaining a manifestation of the difference between the static pressures of the borehole fluid adjacent the chambers.
2. Apparatus as recited in claim 1, in which:
   the means responsive to the displacements of the diaphragm means comprises a differential transformer for translating movement of the connecting means in the direction of its extent into electrical signals.
3. Apparatus as set forth in claim 1, in which:
   the casing has openings therein to expose the link to the borehole fluid intermediate the measuring chambers.
4. Apparatus as set forth in claim 1, in which:
   the chambers are comprised of bellows with the diaphragm means being movable ends thereof.
5. Apparatus as defined in claim 1, in which:
   the first and second diaphragm means are subjected to the static pressure of the fluid through elongated slots in the sides of the casing, the dimension of said slots being such to render the first and second diaphragm means substantially unresponsive to the dynamic pressure created by the relative movement of the casing through the borehold fluid.
6. Apparatus for examining fluid-filled boreholes and the like, comprising:
   an elongated casing adapted to be vertically immersed in the borehole fluid;
   first and second diaphragm means carried by the casing forming a pair of vertically spaced measuring chambers of which a respective diaphragm means is displaceable from a reference position in response to the static pressure of the borehole fluid adjacent thereto, the interiors of the respective chambers being intercommunicated;
   means carried by the casing responsive to the displacements of the first and second diaphragm means from the respective reference positions for obtaining a manifestation of the difference between the static pressures of the borehole fluid adjacent the chambers; and
   a rigid link connecting the first and second diaphragm means for maintaining equal displacements of the first and second diaphragm means from the respective reference positions and having therethrough a passage by which the interiors of the chambers are intercommunicated.
7. Apparatus for examining fluid-filled boreholes and the like, comprising:
   an elongated casing adapted to be vertically immersed in the borehole fluid;
   first and second diaphragm means carried by the casing forming a pair of vertically spaced measuring chambers of which a respective diaphragm means is displaceable from a reference position in response to the static pressure of the borehole fluid;
   means connecting the first and second diaphragm means for maintaining equal displacements of the first and second diaphragm means from the respective reference positions;
   a carriage mounted on the casing for longitudinal deformation independently of longitudinal deformation of the casing and supporting the first and second diaphragm means to maintain substantially fixed the distance between the reference positions associated therewith; and
   means carried by the casing responsive to the displacements of the first and second diaphragm means from the reference positions for obtaining a mani- festation of the difference between the static pressures of the borehole fluid adjacent the chambers.

8. Apparatus as defined in claim 7, in which:
the link and carriage each have associated therewith a coefficient of thermal linear expansion, said coefficients of thermal linear expansion being substantially equal.

9. Apparatus for examining fluid-filled boreholes and the like, comprising:
an elongated casing adapted to be vertically immersed in the borehole fluid;
first and second diaphragm means carried by the casing forming a pair of vertically spaced measuring chambers of which a respective diaphragm means is displaceable from a reference position in response to the static pressure of the borehole fluid adjacent thereto, the interiors of the respective chambers being intercommunicated;
a filling fluid occupying the measuring chambers;
a link connecting the first and second diaphragm means for maintaining equal the displacements of the first and second diaphragm means from the respective reference positions, at least a portion of the link being linearly deformable in response to temperature changes of the filling fluid, such deformation being related to the displacement of the diaphragm means in response to changes in density of the filling fluid to thereby compensate linear movement of the link due to changes in filling fluid density; and
means responsive to the displacement of the diaphragm means including an electrical device having a moveable element coupled to the link for translating movement of the link into electrical signals.

10. Apparatus in accordance with claim 9, further comprising:
a carriage in the casing extending in the direction of casing elongation and supporting the bellows to maintain the distance therebetween substantially fixed, the carriage supporting the electrical device; and
having associated therewith a coefficient of thermal linear expansion which is substantially equal to the coefficient of thermal linear expansion of the remaining section of the link.

11. Apparatus for examining fluid-filled boreholes and the like, comprising:
an elongated casing adapted for vertical immersion in the borehole fluid;
first and second bellows forming a pair of vertically spaced measuring chambers and each having a movable end displaceable from a reference position in response to the static pressure of the borehole fluid adjacent thereto;
a link connecting the movable ends of the bellows and including a section of which at least a portion has a coefficient of thermal linear expansion which is different from the coefficient of thermal linear expansion of the remaining section of the link;
means responsive to displacement of the movable ends of the bellows from the reference position for obtaining a manifestation of the linear motion of the link in response to differences in the static pressures of the borehole fluid adjacent the bellows.

12. Apparatus according to claim 11, in which:
a portion of the link extends through the movable and fixed ends of one of the bellows.

13. Apparatus for examining fluid-filled boreholes and the like, comprising:
an elongated casing adapted to be vertically immersed in the borehole fluid;
first and second diaphragm means carried by the casing forming a pair of vertically spaced measuring chambers of which a respective diaphragm means is displaceable from a reference position in response to the static pressure of the borehole fluid adjacent thereto, the interiors of the respectoive chambers being intercommunicated;
fluid substantially filling each of the measuring chambers; and
auxiliary chamber means defining a container for the filling fluid intercommunicating with the lower measuring chamber of said pair, the container having a volume which is variable in accordance with temperature changes of the filling fluid.

14. Apparatus as set forth in claim 13, in which:
the first and second diaphragm means have associated therewith a first elastic coefficient;
the auxiliary chamber means has associated therewith a second elastic coefficient; and
the second elastic coefficient is substantially less than the first elastic coefficient.

15. Apparatus as defined in claim 13 in which:
the auxiliary chamber is subjacent the lower measuring chamber of said pair and intercommunicates with the lower measuring chamber through a passage, the apparatus further comprising:
fluid damping means in the passage to dynamically control the flow of the fluid therethrough,
whereby the rate of transfer of filling fluid between the auxiliary and lower measuring chambers due to dynamic forces acting the filling fluid is restricted.

16. Apparatus for examining fluid-filled boreholes and the like, comprising:
an elongated casing adapted for vertical immersion in the borehole fluid;
first and second bellows carried by the casing and forming a pair of vertically spaced measuring chambers of which each bellows includes a diaphragm displaceable in the direction of casing elongation;
a rigid link extending in the direction of elongation and mechanically connecting the diaphragms of the first and second bellows;
plug means disposed in the casing adjacent each end of the bellows for shielding the bellows from the effects of dynamic pressure resulting from the relative movement of the casing through the borehole fluid, the plug means adjacent the diaphragm of the bellows having apertures therethrough for receiving the rigid link; and
means carried by the casing responsive to the displacements of the first and second diaphragm from the reference position for obtaining a manifestation of the difference between the static pressures of the borehole fluid adjacent the chambers.

17. Apparatus for examining fluid-filled boreholes and the like, comprising:
an elongated casing adapted to be vertically immersed in the borehole fluid;
first and second diaphragm means carried by the casing forming a pair of vertically spaced measuring chambers of which a respective diaphragm means is displaceable from a reference position in response to the static pressure of the borehole fluid adjacent thereto, the interiors of the respective chambers being intercommunicated;
means carried by the casing responsive to the displacements of the first and second diphragm means from the reference positions for obtaining a manifestation of the difference between the static pressures of the borehole fluid adjacent the chambers;
means defining a chamber superjacent the upper measuring chamber of said pair and communicating therewith; and
fluid filling the measuring chambers and the superjacent chamber, the means responsive to the displacement of the diaphragm means being immersed in the filling fluid in the superjacent chamber.

18. Apparatus for examining fluid-filled boreholes and the like, comprising;

an elongated casing adapted for vertical immersion in the borehole fluid;

first and second diaphragm means forming a pair of vertically spaced measuring chambers of which a respective diaphragm means is displaceable from a reference position in response to the static pressure of the borehole fluid adjacent thereto, the first and second diaphragm means having associated therewith a thermoelastic coefficient related to the displacement characteristics thereof;

resilient means connected to at least one of the diaphragm means having a thermolastic coefficient that in opposite in arithmetical sign to the thermoelastic coefficient associated with the diaphragm means; and means carried by the casing responsive to the displacements of the first and second diaphragm means from the reference positions for obtaining the manifestation of the difference between the static pressures of the borehole fluid adjacent the chamber.

19. Apparatus in accordance with claim 18, in which:

the chambers are comprised of bellows with one of the ends thereof affixed to a support member, the diaphragm means being the opposite movable ends thereof;

the resilient means comprises a spring inside the bellows and acting between the support member and the movable end of the bellows.

20. Apparatus for examining fluid-filled boreholes and the like, comprising:

an elongated casing adapted for vertical immersion in the borehole fluid;

first and second bellows assemblies defining a pair of vertically spaced measuring chambers each including a diaphragm displaceable from a reference position in response to the static pressure of the borehole fluid adjacent thereto;

a rigid tube connecting the diaphragm of the bellows assembly and interconnecting the interiors of the measuring chambers;

fluid filling the measuring chambers and the tube, the mass of the tube and bellows assemblies being approximately equal to the product of the length of the tube, the density of the filling fluid and the operative area of the movable ends of the bellows assemblies; and means responsive to the displacement of the movable ends of the bellows assemblies for producing a manifestation of the difference between the static pressures of the borehole fluid adjacent the chambers.

21. Apparatus for examining fluid-filled boreholes and the like, comprising:

an elongated casing adapted for vertical immersion in the borehole fluid;

first and second diaphragm means carried by the casing forming a pair of vertically spaced measuring chambers of which a respective diaphragm means is displaceable from a reference position in response to the static pressure of the borehole fluid adjacent thereto, the interiors of the respective chambers being intercommunicated;

means connecting the first and second diaphragm means, the first and second diaphragm means and the connecting means comprising a movable system having a mechanical time constant of movement of about .1 second; and means carried by the casing responsive to the displacements of the first and second diaphragm means from the respective reference positions for producing a manifestation of the difference between the static pressures of the borehole fluid adjacent the chambers.

22. Apparatus as defined in claim 21, in which:

the means responsive to displacement of the diaphragm means is operable to develop an electrical signal representing said displacement and has associated therewith an electrical time constant; and the electrical time constant is larger than the mechanical time constant associated with the movable system.

23. Apparatus as set forth in claim 22, in which:

the electrical time constant is about between .5 second and 1 second.

References Cited

UNITED STATES PATENTS

| | | | |
|---|---|---|---|
| 2,451,605 | 10/1948 | Barnes | 73—438 |
| 2,821,857 | 2/1958 | Basilevsky | 73—438 |
| 3,184,965 | 5/1965 | Noik | 73—438 X |

RICHARD C. QUEISSER, Primary Examiner

J. W. MYRACLE, Assistant Examiner

U.S. Cl. X.R.

73—438